Dec. 12, 1933.　　　　　A. J. SMITH　　　　1,938,871
FASTENING STRIP FOR TRIM MATERIAL
Original Filed Nov. 15, 1930
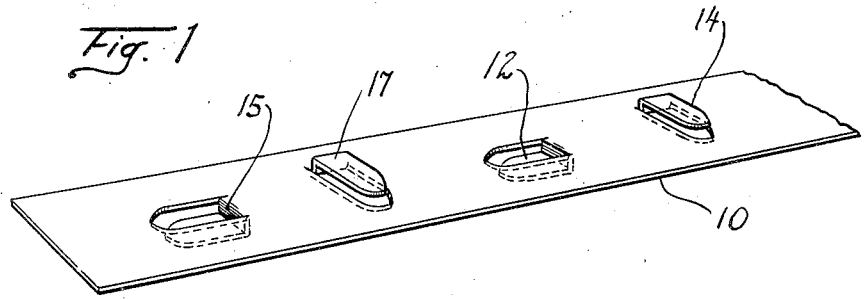
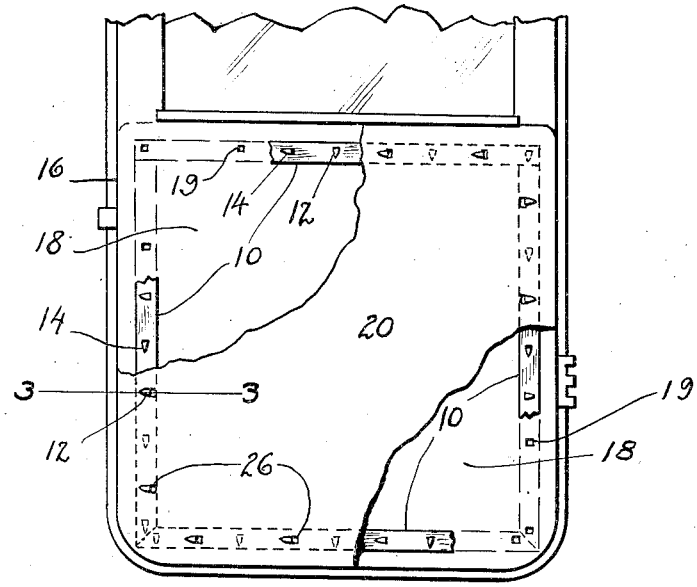
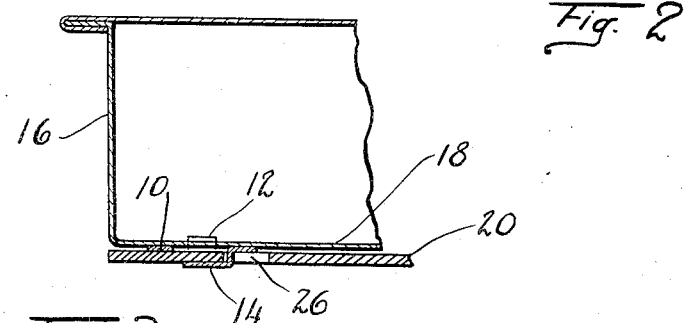
INVENTOR.
Alfred J. Smith
BY
Parker & Burton
ATTORNEYS.

Patented Dec. 12, 1933 1,938,871

UNITED STATES PATENT OFFICE 1,938,871

FASTENING STRIP FOR TRIM MATERIAL

Alfred J. Smith, Detroit, Mich., assignor to Woodall Industries Incorporated, a corporation of Michigan Original application November 15, 1930, Serial No. 495,940. Divided and this application January 19, 1932. Serial No. 587,567

6 Claims. (Cl. 24—73)

My invention relates to improvements in interior trim construction for automotive vehicles and has particular reference to an improved fastening strip utilized to secure interior trim panels to a supporting frame. This application constitutes a division of my copending application Serial No. 495,940, filed November 15, 1930.

An important object of my invention is to eliminate to a large extent the time required to position the panel by providing an integral fastening element adapted to extend along the entire length of one edge of a panel and to be secured thereto as a unit and to be also secured to the frame as a unit. I propose to provide each extended integral fastening element with means whereby it may be secured, from the rear, along the edge of the panel by a single movement of the trim worker and subsequently positioned firmly in place upon the supporting frame of the automotive vehicle with a like movement.

With my improved fastening means it will simply be necessary to insert one of the individual strip fastening units along each edge of the trimmed panel, from the rear face thereof, each insertion requiring but one movement on the part of the trim man, and subsequently secure the entire panel in position with a single similar movement on the part of said worker.

Another important object is to provide a fastener adapted to extend as a unit along one entire edge of a panel and to function as a unit to hold the panel as a unit along said edge securely against the supporting frame.

While I have illustrated the invention in conjunction with automotive vehicle structure it will be apparent that the application of the particular fastening means described and claimed herein is in no wise limited to this particular art, its utility extending to any instance where it is desirable to secure a panel to a supporting frame provided therefor. Referring now to the drawing wherein like numerals illustrate like parts throughout the several figures and wherein:

Fig. 1 is a perspective of my improved fastening unit,

Fig. 2 is an elevation partly broken away of a panel positioned by means of the improved unit, and Fig. 3 is a section along 3—3 of Fig. 2.

Numeral 10 indicates a relatively thin strip of sheet material, preferably of metal, having tabs 12 and 14 struck therefrom at spaced apart intervals along its length. It will be noted that alternate tabs 12 extend longitudinally along the length of the strip and that alternate tabs 14 extend transversely across the strip.

By utilizing strip material of an inherently springy material each of the tabs 12 and 14 will have a flexible, gripping tendency. I have illustrated my improved fastening means in conjunction with the door frame 16 of a conventional automotive vehicle body. The panel supporting portion 18 of door frame 16 is provided with apertures 19 at intervals around its periphery, these apertures being preferably square or rectangular, and spaced apart at intervals corresponding to the distance between alternate tabs 12 or 14.

Each of the panels 20 is provided with suitable apertures 26, here shown as square or rectangular in shape, at spaced intervals around its margin. While for the sake of simplicity, these panels have been illustrated without any covering or trim material applied thereto, it will be understood that such trim material may be applied to the exposed face of the panel, folded over the edges of the panel and secured to the rear surface without in any way adversely affecting the operations hereafter to be described. It will be noted that each of the tabs 14 and 12, as illustrated in Fig. 1, is preferably provided with a seat portion 15 extending away from the strip 10 and a wall portion 17 lying in a plane substantially parallel to that of the strip itself but displaced therefrom. While this particular form of tab is not essential, it being obvious that there need only be such deformation from outside the plane of the panel as to serve the desired purpose, this particular form has been found desirable.

To position a panel in place on a frame, a plurality of strips 10 are secured to the marginal portion of the rear face of the panel by inserting the tabs 12 or 14 into the apertures 26 of the panel. Inasmuch as the tabs 12 and 14 are designed to aline accurately with the apertures 26 each of these strips may be positioned properly in the panel by a single movement of the trim worker. The strips 10 which are designed to extend vertically, as are the two side strips in Fig. 2, utilize the transverse tabs 14 to secure the strip to the panel while the top and bottom horizontal strips utilize the longitudinally extending tabs 12 for inserting in the panel.

It will be noted that one of the two strips should preferably be slightly different from the remaining three in that the transverse tabs 14, as illustrated in Fig. 2 of the left hand vertical strip, extend in the opposite direction to tabs 14 on the right hand vertical strip. While this is not essential it is preferable for the purpose of securing the panel to the strips more firmly after the strips and panel supported thereby have been positioned upon the supporting frame 16.

Having inserted the strips in position around the margins of the panel these strips will provide rearwardly and downwardly projecting tabs around the entire margin of the panel which are adapted to drop simultaneously in the spaced apart apertures 19 provided in frame 18. The inherent springiness of the tabs function to hold the panel firmly in position upon the frame.

As indicated in Fig. 1 longitudinally extending tabs 12 will be available for this purpose on the vertical side strips, while transversely extending tabs 14 will be in a position to drop into the frame apertures 26 in the horizontal top and bottom strips. Thus it will be apparent that the entire panel is properly positioned in place upon the frame simply by alining the respective tabs 12 and 14 with the apertures 26 provided in the frame and dropping the whole panel as a unit.

The procedure outlined above constitutes a substantial improvement over any assembly hitherto known or utilized for positioning panels on automotive body structure and eliminates the necessity of an individual fastener for each individual opening, the insertion and securing of which requires accuracy and considerable time. Each of the fastener strips 10 requires but a single movement of the trim worker for securing the same to the panel, and since the entire panel may be slipped into place with a single movement after the strips are secured to the margins of the panels, the assembly is simple and rapid.

Having illustrated a preferred embodiment of my improved structure, various others will be apparent to those skilled in the art and for that reason I intend to limit myself only within the scope of the appended claims.

I claim:

1. A panel fastening element comprising a strip of material having tabs struck therefrom at spaced apart intervals along its length, said tabs being struck alternately from opposite sides of said strip and alternate tabs extending longitudinally and transversely thereof.

2. A panel supporting element comprising a strip of inherently resilient material having a plurality of tabs struck therefrom at spaced apart intervals along its length, said tabs being struck alternately upon opposite sides of said strip, the tabs on one side thereof extending longitudinally of said strip and the tabs on the other side extending transversely thereof.

3. A fastening strip having a plurality of fastening portions struck from the body thereof, each of said portions comprising a seat lying in a plane substantially normal to that of the strip, and a wall lying in a plane substantially parallel to that of said strip, each alternate seat being perpendicular to the seat of the adjacent fastening portion.

4. A fastening strip having a plurality of fastening portions struck from the body thereof, each of said portions comprising a seat lying in a plane substantially normal to that of the strip, and a wall lying in a plane substantially parallel to that of said strip, each alternate seat lying on opposite sides of said strip.

5. A fastening strip having a plurality of fastening portions struck from the body thereof, each of said portions comprising a seat lying in a plane substantially normal to that of the strip, and a wall lying in a plane substantially parallel to that of said strip, each alternate seat being perpendicular to the corresponding part of the adjacent fastening portion and lying on opposite sides respectively of the strip.

6. A panel fastening element comprising a strip of material having tabs struck therefrom at spaced apart intervals along its length, said tabs being struck alternately from opposite sides of said strip and alternating tabs extending in perpendicular relation to one another.

ALFRED J. SMITH.